C. STOLLBERG.
ROTARY WIND ACTUATED SHEET METAL SIGN.
APPLICATION FILED MAY 12, 1910.
1,088,378.
Patented Feb. 24, 1914.
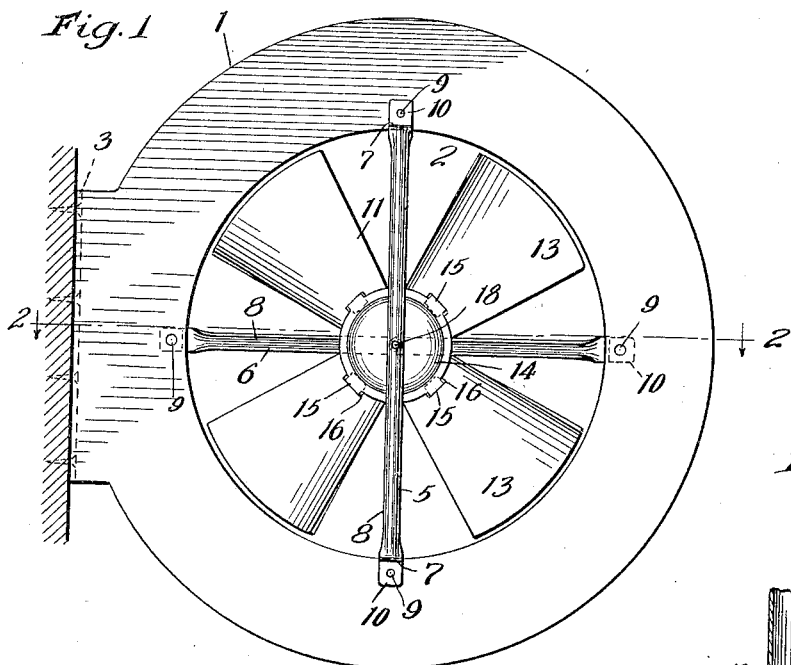
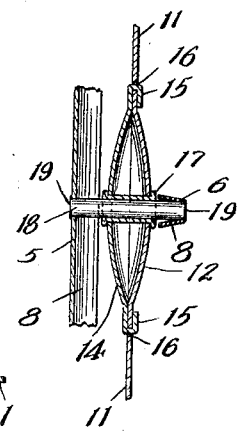
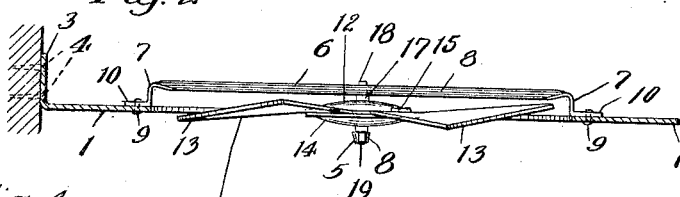
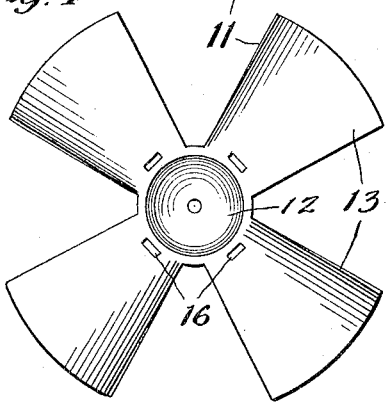
Witnesses:
Wm. Geiger
Inventor:
Charles Stollberg
By Munday, Evarts, Adcock & Clarke
Attorneys.

UNITED STATES PATENT OFFICE.

CHARLES STOLLBERG, OF TOLEDO, OHIO, ASSIGNOR TO AMERICAN CAN COMPANY, OF NEW YORK, N. Y., A CORPORATION OF NEW JERSEY.

ROTARY WIND-ACTUATED SHEET-METAL SIGN.

1,088,378.

Specification of Letters Patent.

Patented Feb. 24, 1914.

Application filed May 12, 1910. Serial No. 560,780.

*To all whom it may concern:*

Be it known that I, CHARLES STOLLBERG, a citizen of the United States, residing in Toledo, in the county of Lucas and State of Ohio, have invented a new and useful Improvement in Rotary Wind-Actuated Sheet-Metal Signs, of which the following is a specification.

My invention relates to improvements in sheet metal rotary signs.

The object of my invention is to provide a rotary wind actuated sheet metal sign, which will be of a neat and attractive appearance, strong and durable, and of a simple construction, composed of few parts and capable of being cheaply manufactured.

My invention consists in connection with an annular sheet metal sign member having an integral supporting bracket at its outer periphery, bent at an angle to its plane and provided on its opposite sides with transversely offset and longitudinally channeled supporting bars crossing each other at right angles, of a sheet metal wind wheel or rotary member fitting in the central opening of the sign member and between the crossing supporting bars thereon and having a central dome or boss portion and a plurality of integral blades, and a coöperating dome shaped center member fitting on the opposite side of the wind wheel and secured thereto by integral tongues or lips which are inserted through slots in the wind wheel member, and a central hub or sleeve extending centrally through the central dome or boss portion of the wind wheel and said central dome shaped member to receive the axle, which extends through and is rigidly secured to the crossing supporting bars on the annular sign member.

My invention also consists in the novel construction of parts and devices and in the novel combinations of parts and devices herein shown and described and more particularly specified in the claim.

In the accompanying drawing forming a part of this specification, Figure 1 is a front elevation of a sheet metal rotary wind actuated sign embodying my invention. Fig. 2 is a cross section on line 2—2 of Fig. 1. Fig. 3 is an enlarged detail section on line 3—3 of the wind wheel or rotary member, and Fig. 4 is an elevation of same.

In the drawing, 1 represents an annular sheet metal sign having a large central opening 2, and an integral supporting member or bracket 3, projecting from the outer periphery of the sign, and bent at an angle to its plane, and provided with holes 4 to receive nails or screws for attaching it to a wall, post or other object.

5, 6 are a pair of sheet metal supporting bars, one on each side of the sign and extending diametrically across the opening therein, and preferably crossing each other at right angles. Each of these supporting members has at its ends lateral offsets 7 and a longitudinal fold 8 to give it a channel or triangular form in cross section to stiffen the bar. Each of the bars 5, 6 is secured to the annular sign by rivets 9 extending through the feet 10 of the bars. The channeled laterally offset supporting bars 5, 6 thus afford a space between them, by reason of their lateral offsets, to receive the wind wheel or rotary member 11 of the sign. The wind wheel or rotary member 11 has a boss or dome shaped central portion 12 and a plurality of integral, radially projecting screw or propeller blades 13, each properly twisted or shaped for actuation by the wind.

14 is the boss or dome shaped center member conforming in size and shape and appearance to the integral dome shaped center 11 of the wind wheel and secured on the opposite side thereof by integral tongues or lips 15 on said member 14, which are inserted through suitable slots 16 in the wind wheel member 11, preferably at the base of the blades 13 and clenched or folded down flat against the sign member to rigidly secure the supplemental center 14 to the wind wheel.

17 is a tubular metal hub extending through suitable openings in the dome center 12 of the wind wheel and supplemental dome center 14 and secured thereto by upsetting. The hollow hub or sleeve 17 receives the fixed axle or pin 18, which extends through the channeled or longitudinally folded supporting bars 5, 6 and is rigidly or fixedly secured thereto by riveting or upsetting the ends 19 of the pin or axle 18, thus securing the two crossing supporting bars together and adding materially to the strength and stiffness of the structure as a whole. The integral dome center 12 of the wind wheel in connection with the supplemental dome center 14 thereof rigidly secured thereto, and the hub sleeve or tube 17 afford great strength to the wind wheel or rotary member of the sign and give the same an extended bearing on the axle.

I claim:—

A sheet metal sign comprising, in combination, a plate having an integral bracket and provided with an opening, a wind wheel rotatably mounted in the opening, said wheel comprising a sheet of metal having a plurality of vanes and an integral perforated dome center, and having secured thereto a supplemental sheet metal perforated dome center, a hub sleeve mounted in said perforations and secured to the dome center pieces, sheet metal strengthening and supporting bars extending across the opening in the plate on opposite sides thereof, and an axle supported by the bars and extending through the hub sleeve, substantially as specified.

CHARLES STOLLBERG.

Witnesses:
L. W. BEEDE,
W. H. BLANK.

Copies of this patent may be obtained for five cents each, by addressing the "Commissioner of Patents, Washington, D. C."